United States Patent
Jang et al.

(10) Patent No.: US 9,017,778 B2
(45) Date of Patent: *Apr. 28, 2015

(54) ADHESIVE COMPOSITION, AND POLARIZING PLATES AND LCDS UTILIZING THE ADHESIVE COMPOSITION

(75) Inventors: Ki Seok Jang, Daegu (KR); Min Soo Park, Daejeon (KR); In Cheon Han, Seoul (KR); Woo Ha Kim, Daejeon (KR); Min Jin Ko, Daejeon (KR); Ki Youl Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 378 days.

This patent is subject to a terminal disclaimer.

(21) Appl. No.: 12/989,334

(22) PCT Filed: Apr. 23, 2009

(86) PCT No.: PCT/KR2009/002132
§ 371 (c)(1),
(2), (4) Date: Jan. 7, 2011

(87) PCT Pub. No.: WO2009/131393
PCT Pub. Date: Oct. 29, 2009

(65) Prior Publication Data
US 2011/0116022 A1    May 19, 2011

(30) Foreign Application Priority Data

Apr. 25, 2008   (KR) .................. 10-2008-0038701

(51) Int. Cl.
| | | |
|---|---|---|
| C08L 33/08 | (2006.01) | |
| C08L 33/10 | (2006.01) | |
| C09J 133/08 | (2006.01) | |
| C09J 133/06 | (2006.01) | |
| G02B 5/30 | (2006.01) | |
| G02F 1/1335 | (2006.01) | |
| C08F 220/18 | (2006.01) | |

(52) U.S. Cl.
CPC .......... *C09J 133/08* (2013.01); *B32B 2457/202* (2013.01); *G02B 5/305* (2013.01); *G02F 1/133528* (2013.01); *C08F 2220/1825* (2013.01); *C09J 133/066* (2013.01)

(58) Field of Classification Search
CPC ........ C09K 19/08; C09K 19/10; C09K 19/12; C09K 19/126; C09K 19/14; C09K 19/16; C09K 19/18; C09K 19/22; C09K 19/28; C09K 19/586; C09K 19/588; C09K 2019/181; C09J 7/0217; C09J 133/04; C09J 133/06; C09J 133/08; C09J 133/10; C09J 133/12; C09J 2203/318; C09J 133/066; G02F 1/133528; C08L 33/08; C08L 33/10; B32B 2457/202; C08K 5/5403; C08F 2220/1825
USPC ............ 156/106; 427/208; 428/1.3, 1.5, 1.52; 349/96; 524/100, 555, 556
See application file for complete search history.

(56) References Cited

U.S. PATENT DOCUMENTS

| | | | |
|---|---|---|---|
| 6,201,045 B1* | 3/2001 | Koike .............................. 524/81 |
| 2003/0054166 A1* | 3/2003 | Chang et al. ............ 428/355 AC |
| 2005/0244633 A1* | 11/2005 | Kobayashi et al. ....... 428/355 R |
| 2006/0049381 A1* | 3/2006 | Klein et al. ............... 252/299.63 |
| 2007/0055006 A1* | 3/2007 | Kim et al. ....................... 524/556 |
| 2007/0114492 A1* | 5/2007 | Cheong et al. ........... 252/299.01 |
| 2007/0166537 A1* | 7/2007 | Nagamoto et al. ...... 428/355 AC |
| 2009/0122236 A1 | 5/2009 | Shutou et al. |
| 2011/0051051 A1* | 3/2011 | Han et al. ......................... 349/96 |
| 2011/0111140 A1* | 5/2011 | Jang et al. .................... 428/1.33 |
| 2011/0177262 A1* | 7/2011 | Kim et al. .................... 428/1.54 |

FOREIGN PATENT DOCUMENTS

| | | |
|---|---|---|
| CN | 1404519 | 3/2003 |
| JP | 09-302070 A | 11/1997 |
| JP | 1998-279907 | 10/1998 |
| JP | 11-12346 A | 1/1999 |
| JP | 11-349947 A | 12/1999 |
| JP | 2002-173656 | 6/2002 |
| JP | 2002-194303 A | 7/2002 |
| JP | 2003-013029 | 1/2003 |
| JP | 2004-516359 A | 6/2004 |
| JP | 2005-187738 A | 7/2005 |
| JP | 2005-281493 A | 10/2005 |
| KR | 2003-0069461 | 8/2003 |
| KR | 10-2005-0006120 A | 1/2005 |
| KR | 10-2005-0085714 A | 8/2005 |
| TW | I234580 | 6/2005 |
| TW | 200720388 | 6/2007 |
| WO | WO 03/070849 A1 | 8/2003 |
| WO | WO 2007/046276 | 4/2007 |
| WO | WO 2009-096758 A1 | 8/2009 |

* cited by examiner

OTHER PUBLICATIONS

Merriam-Webster.com, "liquid crystal" definition.*

*Primary Examiner* — Erik Kashnikow
*Assistant Examiner* — Eli D Strah
(74) *Attorney, Agent, or Firm* — McKenna Long & Aldridge, LLP

(57) ABSTRACT

The present invention relates to a pressure-sensitive adhesive composition, and a polarizer and a liquid crystal display (LCD) device using the pressure-sensitive adhesive composition, and more particularly, to a pressure-sensitive adhesive composition including (A) an acrylic copolymer and (B) a liquid optically-anisotropic compound having a mesogen core in its structure. The liquid optically-anisotropic compound having a mesogen core in its structure according to the present invention has superior solubility and compatibility with pressure-sensitive adhesive resin, and thus the pressure-sensitive adhesive composition including the liquid optically-anisotropic compound can relax stress caused by shrinkage of the polarizer and effectively compensate negative birefringence. Therefore, the polarizer and the LCD device using the pressure-sensitive adhesive composition can prevent light leakage originating from stress concentration in spite of long-term use.

17 Claims, No Drawings

ADHESIVE COMPOSITION, AND POLARIZING PLATES AND LCDS UTILIZING THE ADHESIVE COMPOSITION

This application is a National Stage Entry of International Application No. PCT/KR2009/002132, filed Apr. 23, 2009, and claims the benefit of Korean Application No. 10-2008-0038701, filed on Apr. 25, 2008, which is hereby incorporated by reference for all purposes as if fully set forth herein.

DETAILED DESCRIPTION OF THE INVENTION

1. Technical Field

The present invention relates to a pressure-sensitive adhesive composition, and more particularly, to a pressure-sensitive adhesive composition added thereto optical compensation and a stress-relaxing feature without causing endurance reliability degradation that may occur under a high temperature or high temperature and high humidity condition, and a polarizer and a liquid crystal display (LCD) device using the pressure-sensitive adhesive composition.

2. Background Art

Generally, in preparing liquid crystal display (LCD) devices, liquid crystal cells including liquid crystals and polarizers are basically required and suitable adhesive layers or pressure-sensitive adhesive layers have to be used for binding them. In addition, for improving functions of LCD devices, a phase retardation plate, a compensation plate for wide view angle, a brightness enhancing film, and the like may be used, with additionally adhered to the polarizer.

The main structure forming an LCD device includes, generally, a uniformly aligned liquid crystal layer; a polarizer with a multi-layer structure, incorporated into a pressure-sensitive adhesive layer or an adhesive layer, based on a liquid crystal cell consisting of a transparent glass plate or a plastic sheet material containing a transparent electrode layer; a phase retardation plate; an additional functional film layer; and the like.

The polarizer has a structure including an iodine compound or a dichroic polarizing material aligned in a certain direction. To protect these polarizing elements, multi-layers are formed on both sides using a protective film such as triacetyl cellulose (TAC). In addition, the polarizer may additionally include a phase retardation film having a unidirectional molecular alignment, or a compensation film for wide view angle such as a liquid crystal type film.

The aforementioned films are made of materials having different molecular structures and compositions, so that they have different physical properties. In particular, under a high temperature or high temperature and humidity condition, the dimensional stability according to shrinkage or expansion of materials having a unidirectional molecular alignment is insufficient. As a result, if the polarizer is fixed by a pressure-sensitive adhesive, then stress is concentrated on a TAC layer by shrinkage or expansion of the polarizer under a high temperature or high temperature and humidity condition, leading to birefringence and thus light leakage. In this case, typically, negative birefringence occurs due to the shrunk TAC layer.

The light leakage phenomenon can be suppressed by preventing generation of residual stress with regulation of a stress-relaxing feature of the pressure-sensitive adhesive fixed on the polarizer. This can be achieved when the used pressure-sensitive adhesive has a non-crosslinked structure. On the other otherhand, good high-temperature cohesive strength is required to maintain endurance reliability of a pressure-sensitive adhesive layer, and to this end, it is used in the form of a partially crosslinked viscoelastic material and thus shows suitable pressure-sensitive adhesive properties.

Thus, the pressure-sensitive adhesive layer used in the form of a partially crosslinked viscoelastic material has residual stress under given stress, and high polymers in the crosslinked structure are aligned in a particular direction, resulting in birefringence. In this alignment, the pressure-sensitive adhesive shows negative birefringence.

With a recent tendency to increase the size of LCD panels, the size of polarizers is also increased, whereby the shrinkage of the polarizers and the residual stress of a pressure-sensitive adhesive layer also increase under a heat resistance or moisture resistance condition, resulting in a large negative birefringence and severe light leakage.

Japanese Unexamined Patent Publication No. 1998-279907 discloses a method for improving the light leakage phenomenon by mixing a high molecular weight acrylic polymer and a low molecular weight acrylic polymer having a molecular weight of less than 30,000 to provide a stress-relaxing feature for stress generated from a polarizer, and Korean Patent Publication No. 2003-0069461 discloses a method in which a low molecular weight material representing positive birefringence under residual stress is mixed to correct negative birefringence which is represented in an acrylic pressure-sensitive adhesive layer under residual stress.

However, the low molecular weight material used herein has some problem in its compatibility with the pressure-sensitive adhesive and thus is likely to undergo phase separation with the pressure-sensitive adhesive when being used by a large amount, and may also have some problem in light transmission or endurance.

Japanese Unexamined Patent Publication No. 2002-173656 and 2003-013029 describe methods for regulating the refractive index of a pressure-sensitive adhesive layer by introducing an acrylic monomer containing an aromatic group in its side chain. However, those methods require a large amount of aromatic group-containing acrylic monomers by which the pressure-sensitive adhesive strength of the pressure-sensitive adhesive excessively increases, exerting a negative influence upon a re-releasing property which is a main function of the pressure-sensitive adhesive for a polarizer. Moreover, introduction of a large amount of aromatic group-containing acrylic monomers may degrade the durability of the pressure-sensitive adhesive.

Therefore, in order to suppress light leakage to the maximum without changing main features such as endurance reliability and a re-releasing property that are main functions of the pressure-sensitive adhesive for a polarizer, it is necessary to add an excellent stress-relaxing function to the pressure-sensitive adhesive layer and at the same time, to perform optical compensation for regulating negative birefringence of the pressure-sensitive adhesive, caused by residual stress, into positive birefringence.

Technical Problem

To solve the aforementioned problems of the prior art, an object of the present invention is to provide a pressure-sensitive adhesive composition including an optically-anisotropic compound capable of relaxing residual stress caused by shrinkage or expansion of a polarizer and having excellent compatibility with a pressure-sensitive adhesive, whereby degradation of pressure-sensitive adhesive endurance reliability, which may occur under a high temperature or a high temperature and high humidity condition, is not caused and a light leakage phenomenon originating from non-uniform distribution of residual stress is prevented, and a polarizer and a liquid crystal display (LCD) device using the pressure-sensitive adhesive composition.

Technical Solution

In order to achieve the foregoing objects, the present invention provides a pressure-sensitive adhesive composition including a pressure-sensitive adhesive composition including (A) an acrylic copolymer and (B) a liquid optically-anisotropic compound having a mesogen core in its structure.

The present invention also provides a polarizer including a polarization film and a pressure-sensitive adhesive layer which is formed by the pressure-sensitive adhesive composition on one side or both sides of the polarization film.

The present invention also provides a liquid crystal display (LCD) device comprising a liquid crystal panel in which the polarizer is attached onto one side or both sides of a liquid crystal cell.

Effects of the Invention

The liquid optically-anisotropic compound having a mesogen core in its structure has superior solubility and compatibility with pressure-sensitive adhesive resin, and thus the pressure-sensitive adhesive composition including the compound according to the present invention can relax stress generated by shrinkage of the polarizer and optically compensate negative birefringence in an effective way. Accordingly, the polarizer and the LCD device using the pressure-sensitive adhesive composition can prevent light leakage caused by stress concentration even if they have been used for a long time.

MODE FOR CARRYING OUT THE INVENTION

The present invention relates to a pressure-sensitive adhesive composition including (A) an acrylic copolymer and (B) a liquid optically-anisotropic compound having a mesogen core in its structure.

Generally, in case of using a solid optically-anisotropic compound, birefringence generated by shrinkage of a polarizer can be effective offset. However, the solid optically-anisotropic compound has low solubility with respect to a solvent and has some problem in compatibility with pressure-sensitive adhesive resin, for which it should be comprised in a small amount in a pressure-sensitive adhesive composition and thus shows an insufficient stress-relaxing effect.

However, according to the present invention, a liquid optically-anisotropic compound containing a mesogen core in its structure has excellent solubility with respect to a solvent and compatibility with resin, and thus a pressure-sensitive adhesive composition including the compound can simultaneously implement relaxation of stress generated by shrinkage of a polarizer and optical compensation.

Hereinafter, a description will be made regarding components of the pressure-sensitive adhesive composition according to the present invention.

(A) Acrylic Copolymer

The acrylic copolymer (A) according to the present invention preferably includes, as its main component, i) 70 to 99.9 parts by weight of an alkyl(meth)acrylic acid ester monomer having alkyl of 1 to 14 carbon atoms.

Examples of the alkyl(meth)acrylic acid ester monomer i) having alkyl of 1 to 14 carbon atoms may include methyl (meth)acrylate, ethyl (meth)acrylate, n-propyl (meth)acrylate, isopropyl (meth)acrylate, butyl (meth)acrylate, t-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, tetradecyl (meth)acrylate, and the like, and they can be used alone or in a mixture of two or more kinds thereof. If the number of carbon atoms of alkyl is out of the aforementioned range, the glass transition temperature (Tg) of the pressure-sensitive adhesive is increased, or regulation of the adhesive property may be difficult, for which it is preferable that the number of carbon atoms is 1 to 14.

The acrylic copolymer according to the present invention may comprise, in addition to the alkyl(meth)acrylic acid ester monomer, vinyl monomer represented by Formula 1 in a content of less than 20 parts by weight:

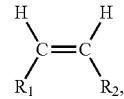

[Formula 1]

where $R_1$ represents hydrogen or alkyl,
$R_2$ represents cyano, phenyl unsubstituted or substituted with alkyl, acetyloxy, or $COR_3$; and $R_3$ represents amino unsubstituted or substituted with alkyl or alkoxy, or glycidyloxy.

In the above formula, in the definitions of $R_1$ to $R_3$, alkyl may be lower alkyl of 1 to 6 carbon atoms, and more preferably, methyl or ethyl. In the definition of $R_3$, alkoxy may be alkoxy of 1 to 6 carbon atoms, and more preferably, methoxy, ethoxy, or butoxy.

Examples of the vinyl monomer represented by Formula 1 may include a styrene monomer such as styrene or alpha methyl styrene; carbonic acid vinyl ester such as vinyl acetate; a nitrogen-containing vinyl monomer such as acrylonitrile, (meth)acryl amide, N-methyl (meth)acryl amide, or N-butoxymethyl (meth)acryl amide, and they can be used alone or in a mixture of two or more kinds thereof.

If the content of the vinyl monomer exceeds 20 parts by weight, the flexibility and peel strength of the pressure-sensitive adhesive composition may be degraded.

The acrylic copolymer according to the present invention may comprise, in addition to the alkyl(meth)acrylic acid ester monomer having alkyl of 1 to 14 carbon atoms, 0.1 to 10 parts by weight of a crosslinking functional group-containing monomer. If the content of the crosslinking functional group-containing monomer exceeds the aforementioned scope, the pressure-sensitive adhesive property and peel strength may be degraded.

Examples of the crosslinking functional group-containing monomer may include a hydroxyl group-containing monomer such as 2-hydroxyethyl (meth)acrylate, 2-hydroxypropyl (meth)acrylate, 4-hydroxybutyl (meth)acrylate, 2-hydroxyethyleneglycol (meth)acrylate, or 2-hydroxypropyleneglycol (meth)acrylate; a carboxyl group-containing monomer such as acrylic acid, methacrylic acid, an acrylic acid dimer, itaconic acid, or maleic acid; and a nitrogen-containing monomer such as acryl amide, N-vinyl pyrrolidone, or N-vinyl caprolactam, and they can be used alone or in a mixture of two or more kinds thereof.

The acrylic copolymer (A) according to the present invention preferably has a weight average molecular weight of 800,000 to 2,000,000. If the weight average molecular weight is less than 800,000, the cohesive strength is insufficient and thus endurance reliability is poor. If the weight average molecular weight exceeds 2,000,000, the crosslinking density of the pressure-sensitive adhesive is increased, resulting in degradation of the stress-relaxing feature.

A preparation method for the acrylic copolymer is not specifically limited, and the acrylic copolymer may be prepared by one of solution polymerization, photo-polymerization, bulk polymerization, suspension polymerization, and emulsion polymerization. Preferably, the acrylic copolymer is prepared by solution polymerization and a polymerization temperature is 50 to 140° C., and a polymerization initiator is preferably added in a state where monomers are evenly mixed.

The polymerization initiator may use an azo-based polymerization initiator such as azo-bisisobutyronitrile or azobiscyclohexanecarbonitrile; or peroxide such as benzoyl peroxide and acetyl peroxide alone or in a mixture thereof.

(B) Liquid Optically-Anisotropic Compound Having a Mesogen Core in its Structure The pressure-sensitive adhesive composition according to the present invention includes a liquid optically-anisotropic compound having a mesogen core in its structure, thereby relaxing stress caused by shrinkage or expansion of a polarizer and improving a light leakage phenomenon through optical compensation for negative birefringence.

The optically-anisotropic compound according to the present invention contains a mesogen core in its structure, whereby it shows positive birefringence and has a melting point of less than room temperature, that is, it is in a liquid state at room temperature, and thus has superior solubility with respect to a solvent and excellent compatibility.

The mesogen core included in the optically-anisotropic compound is preferably represented by Formula 2:

[Formula 2]

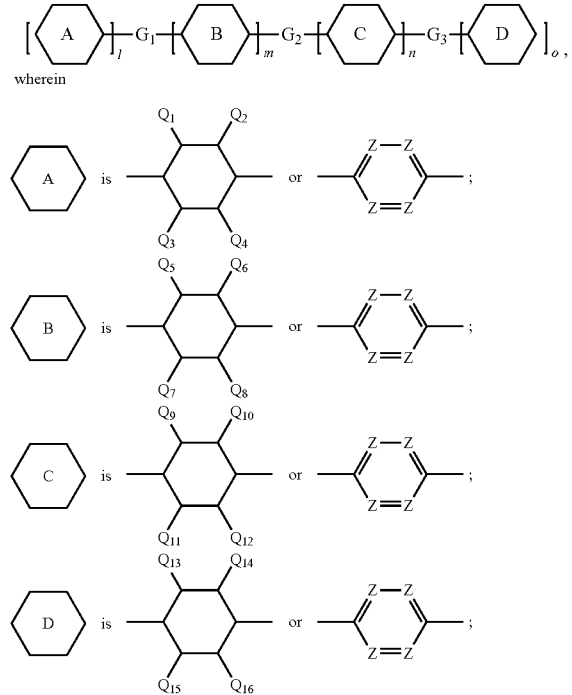

Z is C—W or N;

$Q_1$ through $Q_{16}$, and W are, independently of one another, hydrogen, halogen, cyano, —$R_4$, —$OR_4$, —$NHR_4$, —$NR_4R_4$—$C(=O)R_4$, —$SR_4$, —$SOR_4$, —$SO_2R_4$, —$C(=O)NR_4$, —$NR_4C(=O)R_4$, —$C(=O)OR_4$, —$OC(=O)R_4$, or —$OC(=O)OR_4$, respectively, and $R_4$ is $C_1$ to $C_{20}$ alkyl unsubstituted or substituted with one or more halogens, $C_2$ to $C_{20}$ alkenyl unsubstituted or substituted with one or more halogens, $C_2$ to $C_{20}$ alkynyl unsubstituted or substituted with one or more halogens, or —$(R_5O)_q R_6$;

$R_5$ is $C_1$ to $C_6$ alkylene, $R_6$ is $C_1$ to $C_4$ alkyl, and q is an integer of 1 to 5;

l, m, n, and o are, independently of one another, integers of 0 to 2, and l+m+n+o is an integer greater than 2; and $G_1$, $G_2$, and $G_3$ are, independently of one another, a single bond, —O—, —$NR_5$—, —S—, —SO—, —$SO_2$—, $C_1$ to $C_6$ alkylene, $C_2$ to $C_6$ alkenylene, $C_2$ to $C_6$ alkynylene, —U-T-V—, or —$(R_7)SiMe_2$- respectively, wherein -T- indicates carbonyl (—C(=O)—), U and V indicate a single bond, —O—, —$NR_5$—, —S—, —$(CH_2)_p$—, —$O(CH_2)_p$—, —$(CH_2)_pO$—, and p is an integer of 1 to 5; and $R_7$ is $C_1$ to $C_6$ alkyl, and $Me_2$ is a dimethyl group.

The mesogen core represented by Formula 2 may include, but not limited to, biphenyl, tolan, and/or three or more, preferably three benzene rings.

In addition, $Q_1$ through $Q_{16}$, and W are, independently of one another, hydrogen, $C_1$ to $C_{20}$ alkyl, $C_1$ to $C_{20}$ fluorine alkyl, $C_2$ to $C_{20}$ alkenyl, $C_2$ to $C_{20}$ fluorine alkenyl, $C_2$ to $C_{20}$ alkynyl, or $C_2$ to $C_{20}$ fluorine alkynyl, respectively, and;

$G_1$, $G_2$, and $G_3$ are preferably, independently of one another, a single bond, —CH=CH—, —C≡C—, —U-T-V—, or —$(R_7)SiMe_2$-, and more preferably, a single bond, —C≡C—, —$(R_7)SiMe_2$-, —$(CH_2)_p$—, —$(CH_2)_pC(=O)O$—, —C(=O)O—, or —OC(=O)—, respectively.

Herein, p is an integer of 1 to 5.

The content of the liquid optically-anisotropic compound having a mesogen core in its structure, as a component of the pressure-sensitive adhesive composition according to the present invention, is preferably 5 to 30 parts by weight with respect to 100 parts by weight of the acrylic copolymer. If the content is less than 5 parts by weight, the optical compensation effect obtained from the pressure-sensitive adhesive is degraded. If the content exceeds 30 parts by weight, compatibility is deteriorated due to the excessive use of the compound and a problem may occur in endurance reliability, whereby the positive birefringence is increased relative to the negative birefringence generated by the shrinkage of the polarizer and thus the light leakage phenomenon is likely to occur.

The pressure-sensitive adhesive composition according to the present invention preferably includes 0.01 to 5 parts by weight of a multifunctional crosslinking agent with respect to 100 parts weight of the acrylic copolymer in order to crosslink the acrylic copolymer. If the content is less than 0.01 part by weight, the crosslinking density of the pressure-sensitive adhesive is so low as to cause deterioration of endurance reliability. If the content exceeds 5 parts by weight, the crosslinking density of the pressure-sensitive adhesive is so high as to result in degrading endurance reliability.

The multifunctional crosslinking agent may use one or more selected from the group consisting of an isocyanate compound, an epoxy compound, an aziridine compound, and a metal chelate compound, and more preferably use an isocyanate compound.

The isocyanate compound is not specifically limited, but may be one or more selected from the group consisting of tolylene diisocyanate, xylenediisocyanate, diphenylmethanediisocyanate, hexamethylene diisocyanate, isoform diisocyanate, tetramethylxylene diisocyanate, naphthalene diisocyanate, and their reactants with polyol such as trimethylolpropane and the like.

The epoxy compound is not specifically limited, but may be one or more selected from the group consisting of ethyleneglycol diglycidylether, triglycidylether, trimethylolpropane triglycidylether, N,N,N',N'-tetraglycidylethylenediamine, and glycerine diglycidylether.

The aziridine compound is not specifically limited, but may be one or more selected from the group consisting of N,N'-toluene-2,4-bis(1-aziridinecarboxamide), N,N'-diphenylmethane-4,4'-bis(1-aziridinecarboxamide), triethylenemelamine, bisisoprothaloyl-1-(2-methylaziridine), and tri-1-aziridinylphosphineoxide.

The metal chelate compound is not specifically limited, but may be one or more selected from the group consisting of compounds prepared by coordinating multivalent metal such as Al, Fe, Zn, Sn, Ti, Sb, Mg, and/or V with acetyl acetone or ethyl acetoacetate.

In a process of mixing a pressure-sensitive adhesive composition for forming a pressure-sensitive adhesive layer, a crosslinking reaction of functional groups of the multifunctional crosslinking agent should not occur for even coating. After the coating followed by dryness and aging, a crosslinking structure is formed, thereby obtaining a pressure-sensitive adhesive layer having strong elasticity and cohesion strength.

The pressure-sensitive adhesive composition according to the present invention may further include a silane coupling agent for improving adhesion stability and thus more improving heat resistance/moisture resistance when it is adhered to a glass substrate.

The content of the silane coupling agent may be 0.005 to 5 parts by weight with respect to 100 parts by weight of the acrylic copolymer. If the content is less than 0.005, the pressure-sensitive adhesion reliability may be not enhanced sufficiently. If the content exceeds 5 parts by weight, endurance reliability may be degraded.

The silane coupling agent compound may be γ-glycydoxypropyl trimethoxysilane, γ-glycycloxypropyl methyldiethoxysilane, γ-glycycloxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane, and they may be used alone or in a mixture of two or more kinds thereof.

The pressure-sensitive adhesive composition according to the present invention may additionally include tackifier resin for regulating pressure-sensitive adhesion performance, and the content of the tackifier resin may be in a range of 1 to 100 parts by weight with respect to 100 parts by weight of the acrylic copolymer. If the content is less than 1 part by weight, the tackifying function may be poor. If the content exceeds 100 parts by weight, the compatibility or the cohesion strength of the pressure-sensitive adhesive may be reduced.

The tackifier resin may be (hydrogenated) hydrocarbon resin, (hydrogenated) rosin resin, (hydrogenated) rosin ester resin, (hydrogenated) terpene resin, (hydrogenated) terpene phenol resin, polymerized rosin resin, or polymerized rosin ester resin, and they may be used alone or in a mixture of two or more kinds thereof.

In addition, the composition according to the present invention may properly include one or more additives selected from the group consisting of a plasticizer, epoxy resin, a curing agent, an ultraviolet (UV) stabilizer, antioxidants, a coloring agent, a reinforcing agent, a filler, an antifoaming agent, and a surfactant, in a range which does not have an influence upon the effects of the present invention.

The present invention also relates to a polarizer including a polarization film; and a pressure-sensitive adhesive layer formed by the pressure-sensitive adhesive composition according to the present invention on one side or both sides of the polarization film.

The polarizer according to the present invention includes the pressure-sensitive adhesive layer formed by the pressure-sensitive adhesive composition on one side or both sides of the polarization film, and the polarization film or a polarization device of the polarizer is not specifically limited.

Preferably, for example, the polarization film may be prepared by adding a polarization component such as iodine or dichroic dyes in a polyvinyl alcohol resin film and elongating it. Also, there is no limitation in the thickness of the polarization film and the polarization film may be made in conventional thickness. The polyvinyl alcohol resin may be polyvinyl alcohol, polyvinyl formal, polyvinyl acetal, a saponified product of ethylene and vinyl acetate copolymer, and the like.

On both sides of the polarization film, multilayer film may be formed, in which it is made by laminating protective films such as cellulose films like triacetyl cellulose, etc; polyester films like polycarbonate film, polyethylene terephthalate, etc; poly ether sulphone films; poly olefin films like polyethylene, polypropylene, polyolefin film having the cyclo or norbornene structure, an ethylene propylene copolymer, etc. The thickness of such protective films is not limited specifically, and conventional thickness may be accepted.

In the present invention, a method of forming the pressure-sensitive adhesive layer on the polarization film is not specifically limited. For example, the method may include coating the pressure-sensitive adhesive directly on the surface of the polarization film with Bar Coater and then drying it, or coating the pressure-sensitive adhesive on the surface of the substrate having a peeling property followed by drying and transferring the pressure-sensitive adhesive layer onto the surface of the polarization film, followed by aging.

The polarizer according to the present invention may have laminated thereon one or more layers providing supplementary functions, such as a protective layer, a reflecting layer, an anti-glare film, a phase retardation film, a compensation film for wide view angle, a brightness enhancing film and the like.

The present invention also relates to a liquid crystal display (LCD) device including a liquid crystal panel in which the polarizer is attached onto one side or both sides of a liquid crystal cell.

The polarizer to which the pressure-sensitive adhesive according to the present invention is applied can be applied to all general LCD devices, the kind of liquid crystal panel of which not being specifically limited. Preferably, the LCD device according to the present invention is formed by including a liquid crystal panel in which the polarizer is attached onto one side or both sides of a liquid crystal cell.

Embodiment

The present invention will now be described in more detail by embodiment and comparative examples, and they are used to help understanding of the present invention, without limiting the scope of the present invention.

Acrylic Copolymer

Preparation Example 1

To a 1 L reactor equipped with a cooling system for reflux of nitrogen gas and easy regulation of temperature, a monomer mixture composed of 98 parts by weight of n-butylacrylate (n-BA) and 2 parts by weight of 2-hydroxyethyl(meth)acrylate (2-HEMA) was added, after which 120 parts by weight of ethylacetate (EAc) was added thereto as a solvent. To remove oxygen, nitrogen gas was purged for 60 minutes, and the temperature was kept at 60° C., and then 0.03 parts by weight of azobisisobutyronitrile (AIBN) was added thereto as a reaction initiator and reacted for 8 hours. After reaction, the mixture was diluted with ethylacetate (EAc), thereby preparing an acrylic copolymer having solid content of 20 weight percent and having a weight average molecular weight of 1,500,000.

Preparation Examples 2 and 3

Except for the use of composition shown in Table 1, an acrylic copolymer was prepared in the same manner as in Preparation Example 1.

TABLE 1

| | Component | Preparation Example 1 | Preparation Example 2 | Preparation Example 3 |
|---|---|---|---|---|
| Acrylic Copolymer Composition (Part by Weight) | n-BA | 98 | 95 | 83 |
| | MA | — | — | 15 |
| | 2-HEMA | 2 | — | 2 |
| | AA | — | 5 | — |
| | AIBN | 0.03 | 0.03 | 0.03 |
| | EAc | 120 | 110 | 150 |
| Weight Average Molecular Weight (10 thousand) | | 150 | 160 | 120 | n-BA: n-butylacrylate
MA: methylacrylate
2-HEMA: 2-hydroxyethyl(meth)acrylate
AA: acrylic acid
AIBN: azobisisobutyronitrile
EAc: ethylacetate (unit: part by weight)

Liquid Optically-Anisotropic Compound Containing Mesogen Core in its Structure

Preparation Example 4

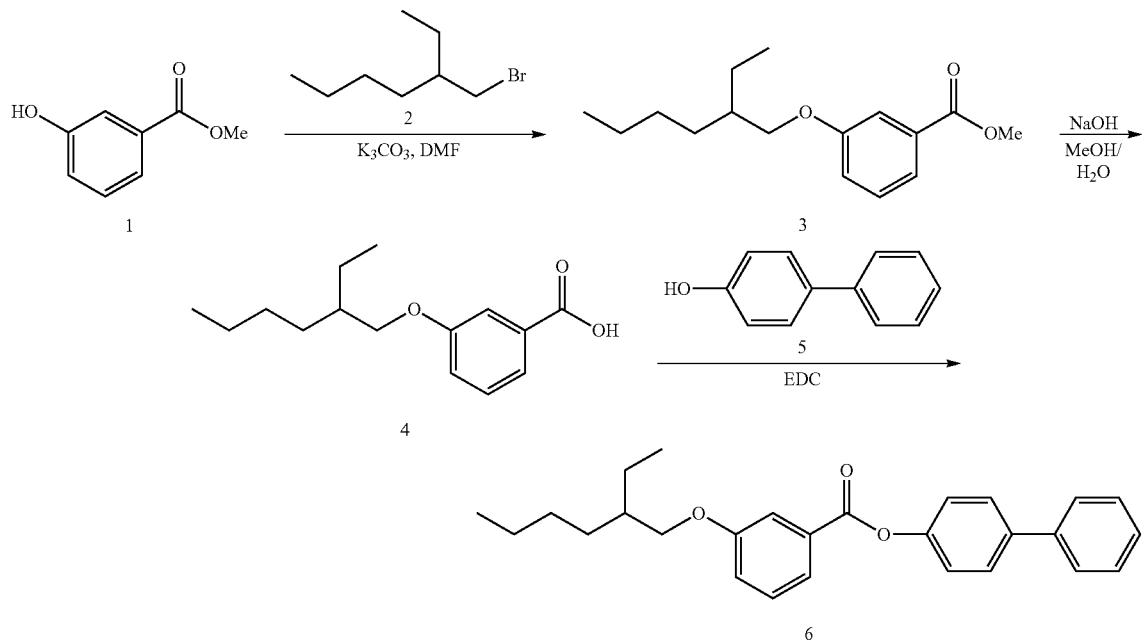

After 1.0 equivalent of Compound 1 was dissolved in a DMF solvent, 1.2 equivalent of 2-ethylhexyl-1-bromide (Compound 2) and 1.5 equivalent of $K_2CO_3$ were added to the mixture and then it was stirred for about 4 hours at 100° C. After completion of reaction, the mixture was worked up with ether and water and refined with silica gel, thereby preparing Compound 3 at a yield of about 87%. This 1.0 equivalent of Compound 3 was dissolved in a mixture solvent of methanol:water=1:1, after which 2.0 equivalent of NaOH was added to the mixture and then stirred for about 1 hour at 80° C. After completion of reaction, the mixture was worked up with ether and water, thereby preparing Compound 4 at a yield of about 95%. 1.0 equivalent of that benzoic acid Compound 4 and 1.0 equivalent of Compound 5 were dissolved in $CH_2Cl_2$. 1.2 equivalent of EDC and 0.1 equivalent of DMAP were added to this mixture and then it was stirred for about 15 hours at room temperature. After completion of reaction, the mixture was worked up with $CH_2Cl_2$ and refined with silica gel, thereby obtaining final Compound 6 at a yield of more than 85%. This was checked with $^1$H-NMR.

1HNMR (400 MHz, $CDCl_3$): d 0.85-1.00 (m, 6H), 1.40 (m, 4H), 1.42-1.60 (m, 4H), 1.80 (m, 1H), 3.98 (t, 2H), 7.22 (dd, 1H), 7.33 (d, 2H), 7.40 (t, 1H), 7.44 (d, 1H), 7.48 (t, 2H), 7.63 (d, 2H), 7.68 (t, 2H), 7.77 (t, 1H), 7.84 (d, 1H)

Preparation Example 5

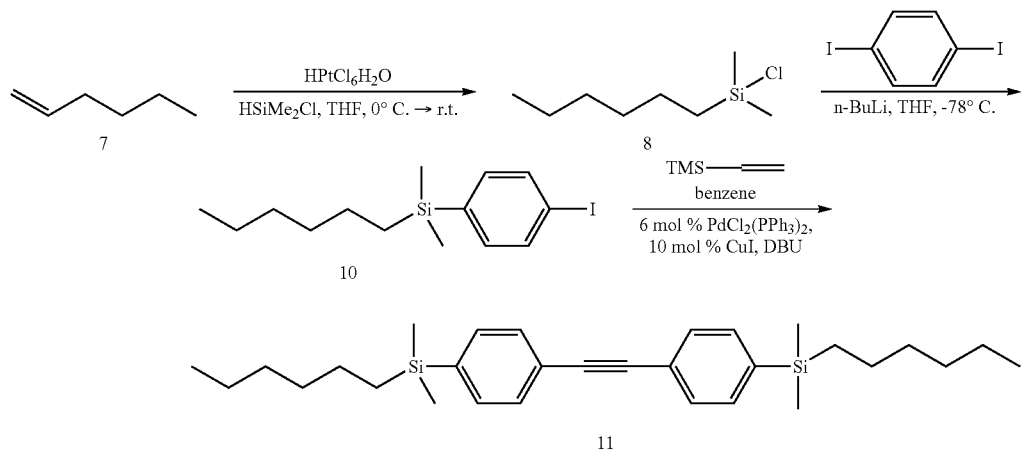

1.2 equivalent of butyl ethylene (Compound 7) was added to a mixture of 1.0 equivalent of $HPtCl_6.H_2O$ and 1.2 equivalent of $HSiMe_2Cl$, and then it was stirred for 3 hour at 0° C. After completion of reaction, the mixture was worked up with ether and water and refined with silica gel, thereby preparing Compound 8 at a yield of about 87%. Next, 1.5 equivalent of n-butyl lithium (n-BuLi) and 1.0 equivalent of Compound 9 were added to 2.0 equivalent of Compound 8 and it was stirred for 6 hour at −78° C., after which the mixture was worked up with ether and water and refined with silica gel, thereby preparing hexyldimethylsilyl phenyl iodide (Compound 10) at a yield of about 72%.

2 g of hexyldimethylsilyl phenyl iodide 10 was put into reflux where 6 mol % of $PdCl_2(PPh_3)_2$ (121.8 mg), 10 mol % of copper (I) iodide (CuI) (110.2 mg), DBU (5.2 ml), and TMS-acetylene (413.52 ul) were dissolved in benzene (25 ml), and then it was stirred for 6 hours. Thus, the obtained solution was filtered by Celite, after which it was reduced-pressure distillated and refined with silica gel.

As a result, final Compound 11 was obtained at a yield of 80% and this was checked with 1H-NMR (Eluent=n-hexane).

1H-NMR (400 MHz, $CDCl_3$): δ (ppm) 0.27 (s, 6H), 0.76 (t, 4H), 0.89 (t, 4H), 1.32 (m, 18H), 7.51 (m, 8H)

Preparation Example 6

1.0 equivalent of Compound 12 was added to a mixture of 1.2 equivalent of Compound 8 and 1.5 equivalent of 2 manganese-butyl lithium, and then it was stirred for 6 hour at 80° C. Thus, the obtained solution was filtered by Celite, after which it was reduced-pressure distillated and refined with silica gel. As a result, final Compound 11 was obtained at a yield of 80% and this was checked with 1H-NMR (Eluent=n-hexane).

1H-NMR (400 MHz, $CDCl_3$): δ (ppm) 0.27 (s, 6H), 0.76 (t, 4H), 0.89 (t, 4H), 1.32 (m, 18H), 7.51 (m, 8H)

Example 1

1) Mixing Process 100 parts by weight (solid content) of a high molecular weight acrylic copolymer obtained in Preparation Example 1 and 5 parts by weight of an optically anisotropic compound obtained in Preparation Example 4 were homogeneously mixed, after which 0.1 parts by weight of tolylene diisocyanate adduct of trimethylolpropane as a multifunctional crosslinking agent and 0.1 parts by weight of γ-glycycloxypropyl trimethoxysilane were added thereto as a silane coupling agent. This mixture was diluted in a proper concentration considering coating properties and then homogeneously mixed, after which the resulting product was coated on a releasing sheet and dried, thereby obtaining a 25 μm homogeneous pressure-sensitive adhesive layer.

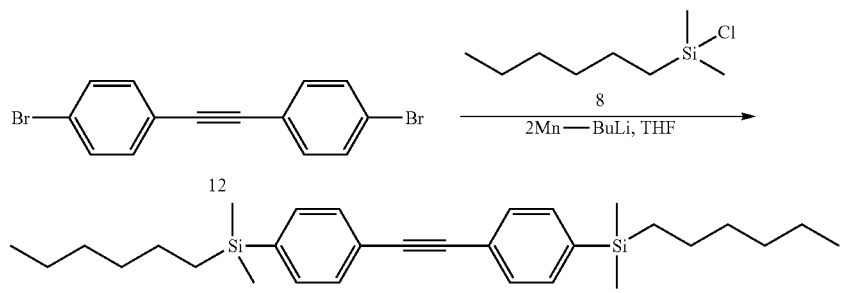

2) Laminating Process

The prepared pressure-sensitive adhesive layer was subjected to pressure-sensitive adhesion processing to an iodine polarizer having a thickness of 185 μm, after which aging was carried out for 7 days at room temperature.

Examples 2 to 8

Except for the use of composition shown in Table 2, mixing and laminating processes were performed in the same manner as in Example 1.

Comparative Examples 1 and 2

Except for the use of composition shown in Table 2, mixing and laminating processes were performed in the same manner as in Example 1.

TABLE 2

|  |  | Examples | | | | Comparative Examples |
|---|---|---|---|---|---|---|
|  |  | 1 | 2 | 3 | 4 | 1 |
| Acrylic copolymer | Preparation Example 1 | 100 | 100 | — | — | 100 |
|  | Preparation Example 2 | — | — | 100 | — | — |
|  | Preparation Example 3 | — | — | — | 100 | — |
| Optically anisotropic compound | Preparation Example 4 | 8 | 10 | 15 | 25 | 0 |
| Crosslinking agent |  | 0.1 | 0.13 | 0.1 | 0.1 | 0.1 |

|  |  | Examples | | | | Comparative Examples |
|---|---|---|---|---|---|---|
|  |  | 5 | 6 | 7 | 8 | 2 |
| Acrylic copolymer | Preparation Example 1 | 100 | 100 | — | — | 100 |
|  | Preparation Example 2 | — | — | 100 | — | — |
|  | Preparation Example 3 | — | — | — | 100 | — |
| Optically anisotropic compound | Preparation Example 5 | 8 | 10 | 15 | 25 | 0 |
| Crosslinking agent |  | 0.1 | 0.13 | 0.1 | 0.1 | 0.1 |

(Unit: Part by Weight)

Test Example

To evaluate the characteristics of a pressure-sensitive adhesive composition prepared in Examples 1 to 8 and Comparative Examples 1 and 2, the following test items were investigated and results thereof are shown in Table 3.

1. Compatibility

A pressure-sensitive adhesive was coated on a releasing sheet and dried, after which it is checked if the pressure-sensitive adhesive becomes hazy due to poor compatibility. The pressure-sensitive adhesive was attached onto a polarizer and was kept at room temperature, low temperature (−20° C.), and high temperature (50° C.) for 6 months, respectively, in order to check if crystallization of an optically anisotropic compound occurred.

2. Endurance Reliability

The polarizers (90 mm×170 mm) which were respectively coated with the pressure-sensitive adhesives prepared in Examples and Comparative Examples were attached onto both sides of glass substrates (110 mm×190 mm×0.7 mm) with each optical absorbing axis crossed, respectively. The glass substrate was subjected to a clean room work under the applied pressure of about 5 kg/cm² so that bubbles or impurities might not be generated. In order to evaluate moisture-heat resistance of the specimens, they were left at a temperature of 60° C. and a relative humidity of 90% for 1000 hours and then observed about formation of bubbles or releases. The specimens were left at room temperature for 24 hours immediately before evaluation of their states. The evaluation standard for endurance reliability was as follows:

○: No bubble or release phenomenon was observed.
Δ: A few bubbles or release phenomenon occurred.
X: A large quantity of bubbles or release phenomenon occurred.

3. Uniformity of Light Transmission (Light Leakage)

To investigate uniformity of light transmission with the above specimens, it was observed whether light was leaked in a dark room using a backlight. To test uniformity of light transmission, a coated polarizer (200 mm×200 mm) was attached onto both sides of a glass plate (210 mm×210 mm×0.7 mm) crossed at 90°. The uniformity of light transmission was evaluated with the following standard:

◎: Non-uniformity phenomenon of light transmission was difficult to determine by the naked eye.
○: Some few non-uniformity phenomenon of light transmission was present.
Δ: More or less non-uniformity phenomenon of light transmission was present.
X: A large quantity of non-uniformity phenomenon of light transmission was present.

TABLE 3

|  | Examples | | | | Comparative Examples |
|---|---|---|---|---|---|
|  | 1 | 2 | 3 | 4 | 1 |
| Compatibility | good | good | good | good | good |
| Endurance Reliability | ○ | ○ | ○ | ○ | ○ |
| Uniformity of light transmission (light leakage) | ◎ | ◎ | ◎ | ◎ | Δ |

|  | Examples | | | | Comparative Examples |
|---|---|---|---|---|---|
|  | 5 | 6 | 7 | 8 | 2 |
| Compatibility | good | good | good | good | good |
| Endurance Reliability | ○ | ○ | ○ | ○ | ○ |
| Uniformity of light transmission (light leakage) | ◎ | ◎ | ◎ | ◎ | Δ |

Referring to Table 3, as shown in Examples 1 to 8 according to the present invention, compatibility, endurance reliability, and uniformity of light transmission (light leakage) are excellent even when an optically anisotropic compound of any one of Preparation Examples 4 and 5 is used.

On the other hand, when an optically anisotropic compound was not added as in Comparative Examples 1 and 2, uniformity of light transmission was poor, resulting in light leakage.

The invention claimed is:
1. A pressure-sensitive adhesive composition, comprising:
   (A) an acrylic copolymer having a weight-average molecular weight of 1,200,000 to 2,000,000; and
   (B) a liquid optically-anisotropic compound containing a mesogen core in a structure thereof,
   wherein the liquid optically-anisotropic compound has a melting point of less than room temperature and the mesogen core comprises tolan,
   wherein the mesogen core is represented by the following Formula:

[Formula]

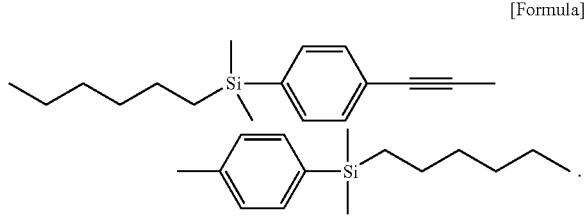

2. The pressure-sensitive adhesive composition of claim 1, wherein the acrylic copolymer comprises 70 to 99.9 parts by weight of alkyl(meth)acrylic acid ester monomer having an alkyl group of 1 to 14 carbon atoms relative to 100 parts by weight of overall acrylic copolymer monomer content.

3. The pressure-sensitive adhesive composition of claim 2, wherein the alkyl(meth)acrylic acid ester monomer is one or more selected from the group consisting of methyl (meth)acrylate, ethyl (meth)acrylate, n-propyl (meth)acrylate, isopropyl (meth)acrylate, butyl (meth)acrylate, t-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, tetradecyl (meth)acrylate.

4. The pressure-sensitive adhesive composition of claim 1, wherein the acrylic copolymer comprises a vinyl monomer represented by the following Formula 1 in a content of less than 20 parts by weight relative to 100 parts by weight of overall acrylic copolymer monomer content:

[Formula 1]

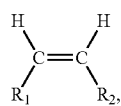

where $R_1$ represents hydrogen or alkyl,
$R_2$ represents cyano, phenyl unsubstituted or substituted with alkyl, acetyloxy, or $COR_3$; and
$R_3$ represents amino unsubstituted or substituted with alkyl or alkoxy, or glycidyloxy.

5. The pressure-sensitive adhesive composition of claim 1, wherein the acrylic copolymer comprises 0.1 to 10 parts by weight of a crosslinking functional group-containing monomer relative to 100 parts by weight of overall acrylic copolymer monomer content.

6. The pressure-sensitive adhesive composition of claim 5, wherein the crosslinking functional group-containing monomer is one or more selected from the group consisting of a hydroxyl group-containing monomer, a carboxyl group-containing monomer, and a nitrogen-containing monomer.

7. The pressure-sensitive adhesive composition of claim 6, wherein the hydroxyl group-containing monomer is one or more selected from the group consisting of 2-hydroxyethyl (meth)acrylate, 2-hydroxypropyl (meth)acrylate, 4-hydroxybutyl (meth)acrylate, 2-hydroxyethyleneglycol (meth)acrylate, and 2-hydroxypropyleneglycol (meth)acrylate.

8. The pressure-sensitive adhesive composition of claim 6, wherein the carboxyl group-containing monomer is one or more selected from the group consisting of (meth)acrylic acid, acrylic acid dimer, itaconic acid, and maleic acid.

9. The pressure-sensitive adhesive composition of claim 6, wherein the nitrogen-containing monomer is one or more selected from the group consisting of acryl amide, N-vinyl pyrrolidone, and N-vinyl caprolactam.

10. The pressure-sensitive adhesive composition of claim 1, wherein the content of the liquid optically-anisotropic compound containing the mesogen core in the structure thereof (B) is 5 to 30 parts by weight with respect to 100 parts weight of the acrylic copolymer.

11. The pressure-sensitive adhesive composition of claim 1, further comprising 0.01 to 5 parts by weight of a multifunctional crosslinking agent with respect to 100 parts by weight of the acrylic copolymer (A).

12. The pressure-sensitive adhesive composition of claim 11, wherein the multifunctional crosslinking agent is one or more selected from the group consisting of an isocyanate compound, an epoxy compound, an aziridine compound, and a metal chelate compound.

13. The pressure-sensitive adhesive composition of claim 1, further comprising 0.005 to 5 parts by weight of a silane coupling agent with respect to 100 parts by weight of the acrylic copolymer (A).

14. The pressure-sensitive adhesive composition of claim 1, further comprising 1 to 100 parts by weight of tackifier resin with respect to 100 parts by weight of the acrylic copolymer (A).

15. A polarizer comprising:
   a polarization film; and
   a pressure-sensitive adhesive layer formed by the pressure-sensitive adhesive composition according to claim 1 on one side or both sides of the polarization film.

16. The polarizer of claim 15, wherein the polarizer comprises one or more layers selected from the group consisting of a protective layer, a reflective layer, a phase retardation film, a compensation film for wide view angle, and a brightness enhancing film.

17. A liquid crystal display (LCD) device comprising a liquid crystal panel in which the polarizer according to claim 15 is attached onto one side or both sides of a liquid crystal cell.

* * * * *